US012399059B2

(12) United States Patent
Sharma et al.

(10) Patent No.: US 12,399,059 B2
(45) Date of Patent: Aug. 26, 2025

(54) OPTICAL CONSTRUCTION INCLUDING LENS FILM AND MASK

(71) Applicant: 3M INNOVATIVE PROPERTIES COMPANY, St. Paul, MN (US)

(72) Inventors: Neeraj Sharma, Lake Elmo, MN (US); Przemyslaw P. Markowicz, Woodbury, MN (US); Timothy J. Reddy, Maplewood, MN (US); Mark A. Roehrig, Stillwater, MN (US); Tri D. Pham, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 309 days.

(21) Appl. No.: 18/265,576

(22) PCT Filed: Nov. 30, 2021

(86) PCT No.: PCT/IB2021/061127
§ 371 (c)(1),
(2) Date: Jun. 6, 2023

(87) PCT Pub. No.: WO2022/130082
PCT Pub. Date: Jun. 23, 2022

(65) Prior Publication Data
US 2024/0027262 A1 Jan. 25, 2024

Related U.S. Application Data

(60) Provisional application No. 63/199,313, filed on Dec. 18, 2020.

(51) Int. Cl.
*G01J 1/04* (2006.01)
*G02B 3/00* (2006.01)
(Continued)

(52) U.S. Cl.
CPC .......... *G01J 1/0411* (2013.01); *G02B 3/0056* (2013.01); *G02B 5/005* (2013.01); *G02B 13/0085* (2013.01); *G06V 40/1318* (2022.01)

(58) Field of Classification Search
CPC . G01J 1/0411; G02B 13/0085; G02B 3/0056; G02B 5/005; G06V 40/1318
See application file for complete search history.

(56) References Cited

U.S. PATENT DOCUMENTS 5,175,030 A 12/1992 Lu et al.
5,183,597 A 2/1993 Lu
(Continued)

FOREIGN PATENT DOCUMENTS

WO WO-2019077419 A1 * 4/2019 ............ G01N 21/55
WO 2020016755 A1 1/2020
(Continued)

OTHER PUBLICATIONS

International Search Report received for PCT International Application No. PCT/IB2021/061127, mailed on Mar. 2, 2022, 7 pages.

*Primary Examiner* — Mark R Gaworecki
(74) *Attorney, Agent, or Firm* — Robert S. Moshrefzadeh

(57) ABSTRACT

Various embodiments of an optical construction and an electronic device that includes such optical construction are disclosed. The optical construction includes a lens film having an outermost structured first major surface and an opposing outermost substantially planar second major surface. The structured first major surface includes a plurality of microlenses. The optical construction also includes a mask disposed adjacent to the second major surface of the lens film and includes a plurality of laser-ablated openings disposed through the mask. The openings are aligned to the (Continued)

microlenses in a one-to-one correspondence. The mask further includes a UV-cured polymer material and an optically absorptive material.

16 Claims, 11 Drawing Sheets

(51) Int. Cl.
*G02B 5/00* (2006.01)
*G02B 13/00* (2006.01)
*G02B 13/14* (2006.01)
*G06V 40/13* (2022.01)

(56) References Cited

U.S. PATENT DOCUMENTS

| | | | |
|---|---|---|---|
| 5,882,774 | A | 3/1999 | Jonza et al. |
| 6,179,948 | B1 | 1/2001 | Merrill et al. |
| 6,783,349 | B2 | 8/2004 | Neavin et al. |
| 6,967,778 | B1 | 11/2005 | Wheatley et al. |
| 7,864,450 | B2 | 1/2011 | Segawa et al. |
| 9,162,406 | B2 | 10/2015 | Neavin et al. |
| 9,919,339 | B2 | 3/2018 | Johnson et al. |
| 2004/0017612 | A1 | 1/2004 | Fadel et al. |
| 2006/0082887 | A1* | 4/2006 | Po-Hung ............ G02B 19/0066 359/626 |
| 2006/0139758 | A1 | 6/2006 | Segawa et al. |
| 2007/0002452 | A1 | 1/2007 | Munro |
| 2007/0002453 | A1 | 1/2007 | Munro |
| 2007/0228965 | A1* | 10/2007 | Cha ........................ G03B 21/62 313/582 |
| 2010/0067757 | A1* | 3/2010 | Arai .................... G06V 40/1318 382/128 |
| 2012/0064296 | A1 | 3/2012 | Walker, Jr. et al. |
| 2013/0011608 | A1 | 1/2013 | Wolk et al. |
| 2013/0235614 | A1 | 9/2013 | Wolk et al. |
| 2014/0085865 | A1* | 3/2014 | Yun ....................... G02B 3/0006 359/619 |
| 2019/0333431 | A1* | 10/2019 | Dodson ................ G02B 5/0215 |

FOREIGN PATENT DOCUMENTS

| | | |
|---|---|---|
| WO | 2020035768 A1 | 2/2020 |
| WO | 2020133703 A1 | 7/2020 |
| WO | 2021205248 A1 | 10/2021 |
| WO | 2021255596 A1 | 12/2021 |
| WO | 2022058815 A1 | 3/2022 |
| WO | 2022130084 A1 | 6/2022 |
| WO | 2022130085 A1 | 6/2022 |

* cited by examiner

OPTICAL CONSTRUCTION INCLUDING LENS FILM AND MASK

CROSS REFERENCE TO RELATED APPLICATIONS

This application is a national stage filing under 35 U.S.C. 371 of PCT/IB2021/061127, filed Nov. 30, 2021, which claims the benefit of U.S. Provisional Application No. 63/199,313, filed Dec. 18, 2020, the disclosures of which are incorporated by reference in their entireties herein.

BACKGROUND

Some handheld devices such as smartphones and tablets can include partial or full-screen fingerprint sensing technology that can simplify device access and enhance security. Such devices can include a fingerprint sensor that detects light that is reflected from a fingerprint of a person that is touching an outer surface of a display of the device. The reflected light can be transmitted through a microlens array that directs the light through a pinhole array or mask to a detector or sensor array. The detected light can be compared to a stored image or images of the user's fingerprints of an authorized user of the device to determine whether the person is an authorized user.

SUMMARY

The present disclosure relates generally to optical constructions and methods of making optical constructions. An optical construction can include a lens film and a mask disposed adjacent to the lens film, where the mask includes a plurality of openings disposed through the mask, where the openings are aligned to microlenses of the lens film in a one-to-one correspondence. The mask can include an absorbing material that is adapted to absorb light that is not directed through the openings of the mask.

In one aspect, the present disclosure provides an optical construction that includes a lens film having an outermost structured first major surface and an opposing outermost substantially planar second major surface. The structured first major surface includes a plurality of microlenses. The optical construction also includes a mask disposed adjacent to the second major surface of the lens film and includes a plurality of laser-ablated openings disposed through the mask. The openings are aligned to the microlenses in a one-to-one correspondence. The mask further includes a UV-cured polymer material and an optically absorptive material.

In another aspect, the present disclosure provides an electronic device that includes an optical construction. The optical construction includes a lens film having an outermost structured first major surface and an opposing outermost substantially planar second major surface. The structured first major surface includes a plurality of microlenses. The optical construction also includes a mask disposed adjacent to the second major surface of the lens film and having a plurality of laser-ablated openings disposed through the mask. The openings are aligned to the microlenses in a one-to-one correspondence. The mask further includes a UV-cured polymer material and an optically absorptive material. The electronic device further includes an optical sensor disposed adjacent to the optical construction such that the mask is disposed between the lens film and the optical sensor.

In another aspect, the present disclosure provides a method that includes disposing a plurality of microlenses on a first major surface of a lens film; disposing a mask adjacent to a second major surface of the lens film, where the mask includes a UV-curable polymer material and an optically absorptive material; and disposing a plurality of openings through the mask that are aligned to the microlenses of the plurality of microlenses in a one-to-one correspondence.

All headings provided herein are for the convenience of the reader and should not be used to limit the meaning of any text that follows the heading, unless so specified.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements.

The words "preferred" and "preferably" refer to embodiments of the disclosure that may afford certain benefits, under certain circumstances; however, other embodiments may also be preferred, under the same or other circumstances. Furthermore, the recitation of one or more preferred embodiments does not imply that other embodiments are not useful and is not intended to exclude other embodiments from the scope of the disclosure.

In this application, terms such as "a," "an," and "the" are not intended to refer to only a singular entity but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

Figure 1:
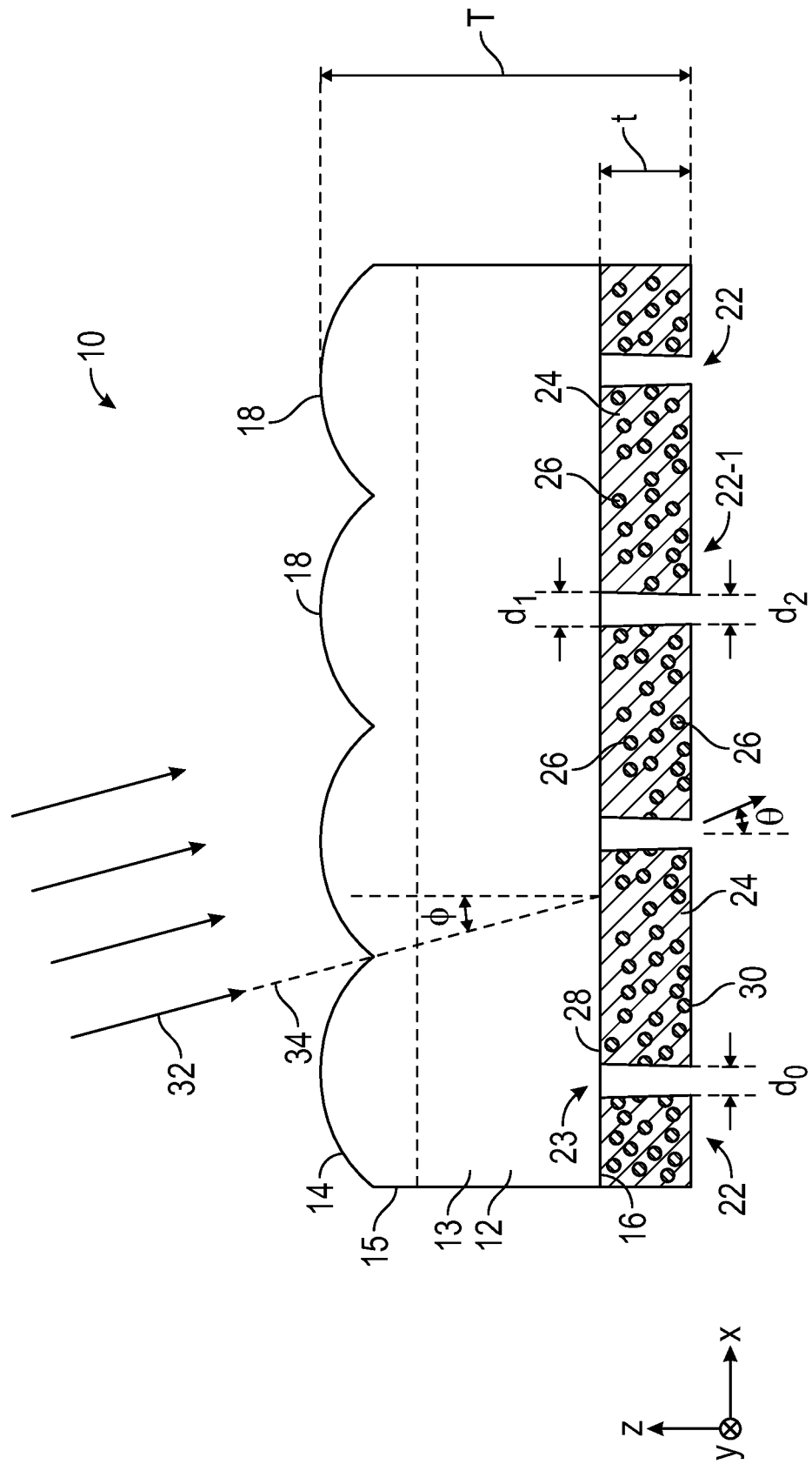
FIG. 1 is a schematic cross-section view of one embodiment of an optical construction.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

The present disclosure relates generally to optical constructions and methods of making optical constructions. An optical construction can include a lens film and a mask disposed adjacent to the lens film, where the mask includes a plurality of openings disposed through the mask, where the openings are aligned to microlenses of the lens film in a one-to-one correspondence. The mask can include an absorbing material that is adapted to absorb light that is not directed through the openings of the mask.

A typical optical construction can include a microlens array and a mask that includes a metal layer that has an array of openings (e.g., pinholes) corresponding to the microlenses. Such metal mask can, however, cause unwanted specular reflection from regions of the mask between openings as the metal can be both absorptive and reflective. In general, a thin metal layer will not be sufficient to prevent cross talk. While the metal mask can be replaced with a polymeric layer that includes optically absorptive material that can reduce cross talk, such polymeric layers require greater thicknesses and have lower optical densities as compared to a metal layer having the same thickness. While such thicker polymeric layers can reduce cross-talk between openings, forming uniform openings can be more challenging with increasing thickness of the layers.

One or more embodiments of optical constructions described herein can exhibit one or more advantages over typical constructions. For example, an optical construction of the present disclosure can include an optically opaque mask that exhibits a sharp peak in optical transmittance through the optical construction. Further, openings disposed through the mask can have substantially linear sidewalls and open ends with high circularity. Such openings can have a high uniformity of area of the open ends. In one or more embodiments, the mask can also have a high optical density. As used herein, the term "high optical density" means an optical density of greater than 2. Further, one or more embodiments, of masks described herein can have improved laser processability over masks that include only thin metal layers. Such improved laser processability can in turn improve the characteristics of the openings that are formed through the mask by a laser.

In one or more embodiments, the mask can include a UV-cured polymeric layer that can absorb incident light that is transmitted through a lens film disposed adjacent to the mask. As used herein, the term "light" means electromagnetic radiation in the visible and/or near infrared range, i.e., in a range of about 400 nm to about 1100 nm unless otherwise specified.

In one or more embodiments, the optical constructions described herein can be useful as angular optical filters for a variety of applications such as fingerprint sensing applications. For example, an optical construction may be disposed between a fingerprint sensing area and a sensor in a device (e.g., smartphone) and can be adapted to transmit light reflected from a finger in the fingerprint sensing area from a desired angle or angles to the sensor while rejecting light incident on the optical construction from undesirable angles.

FIG. 1 is a schematic cross-section view of one embodiment of an optical construction 10. The optical construction 10 includes a lens film 12 having an outermost structured first major surface 14 and an opposing outermost substantially planar second major surface 16. The structured first major surface 14 includes a plurality of microlenses 18. In one or more embodiments, the plurality of microlenses 18 can be arranged along orthogonal first and second directions (e.g., in the x- and y-directions as shown in FIG. 1). The construction 10 also includes a mask 20 disposed adjacent to the second major surface 16 of the lens film 12. As used herein, the term "adjacent to" means that the mask 20 is disposed closer to the second major surface 16 of the lens film 12 than to the first major surface 14 of the film such that the mask can receive light transmitted through the second major surface of the lens film. The mask 20 includes a plurality of openings 22 disposed through the mask. In one or more embodiments, the plurality of openings 22 can be arranged along the first and second directions (e.g., the x- and y-directions of FIG. 1). The openings 22 can be aligned to the microlenses 18 in a one-to-one correspondence. In one or more embodiments, the openings 22 are laser-ablated openings. The mask 20 further includes a UV-cured polymer material 24 and an optically absorptive material 26.

The optical construction 10 can have any suitable dimensions and take any suitable shape or shapes. For example, the optical construction 10 can have a total thickness T in a range of about microns to about 200 microns or about 30 microns to about 100 microns.

The lens film 12 can include any suitable lens film or films. Further, the lens film 12 can take any suitable shape or shapes and having any suitable dimensions. The lens film 12 includes the outermost structured first major surface 14 and the opposing outermost substantially planar (e.g., planar or nominally planar or planar up to variations or curvature that are small compared to that of the structured first major surface) second major surface 16. The structured first major surface 14 includes the plurality of microlenses 18. In one or more embodiments, the plurality of microlenses 18 can be arranged along orthogonal first and second directions (e.g., the x- and y-directions of FIG. 1). The lens film 12 can be a unitary film or can include two or more films or layers.

The microlenses 18 can be disposed on or in the first major surface 14 of the lens film 12 using any suitable technique or techniques, e.g., cast and cure processes as generally described in U.S. Pat. No. 5,175,030 (Lu et al.), U.S. Pat. No. 5,183,597 (Lu) and U.S. Pat. No. 9,919,339 (Johnson et al.), and in U.S. Pat. Appl. Publ. No. 2012/0064296 (Walker, J R. et al), for example. Such cast and cure processes may utilize an acrylate resin to form the microlenses 18. Further, the microlenses 18 can be disposed on a separate layer or layers that are disposed on the first major surface 14 of the lens film using any suitable technique or techniques. For example, the lens film 12 can include a substrate layer 13 and a lens layer 15 disposed thereon such that the lens layer forms the outermost structured first major surface 14 and the substrate layer forms the outermost substantially planar second major surface 16. The lens layer 15 can be connected to the substrate layer 13 using any suitable technique or techniques, e.g., adhered together with an optically-clear adhesive.

A microlens is generally a lens with at least two orthogonal dimensions (e.g., a height and a diameter, or a diameter along two axes) of less than about 1 mm and greater than about 100 nm. The microlenses 18 can each have any suitable average diameter, e.g., an average diameter in a range of about 0.5 microns to about 500 microns, or about 5 microns to about 100 microns. Further, each of the microlenses 18 can have any suitable average radius of curvature, e.g., an average radius of curvature in a range of about 5 microns to about 50 microns. The microlenses 18 can take any suitable shape or shapes. For example, the microlenses 18 can be spherical or aspherical microlenses. In one or more embodiments, the microlenses 18 are pillow lenses that can allow for a higher fraction of the area covered by the lenses to be optically active. A pillow lens may be substantially symmetric under reflection about two orthogonal planes (e.g., planes passing through a center of the lens and parallel to the x-z plane and the y-z plane, respectively), or about three planes parallel to the thickness direction of the lens film, where each plane makes an angle of about 60 degrees with each other plane, without being rotationally symmetric about any axis.

Figure 2:
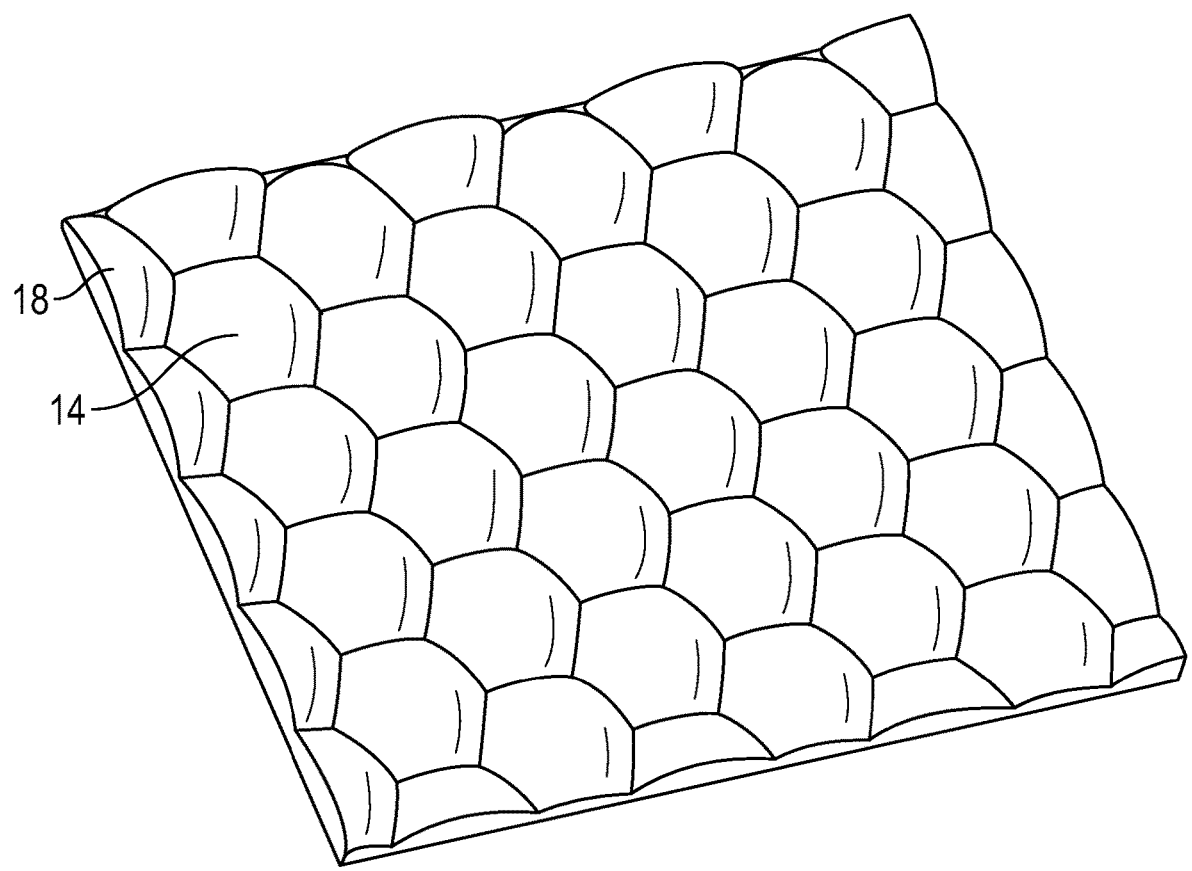
FIG. 2 is a schematic top perspective view of an exemplary lens film.

The microlenses 18 can be disposed on the first major surface 14 of the lens film 12 in any suitable pattern or arrangement. In one or more embodiments, the microlenses 18 are arranged in a periodic arrangement, e.g., a hexagonal pattern (see, e.g., FIG. 2), a square pattern, etc. The microlenses 18 can fill a large fraction (at least about 85%) of a total area of the structured first major surface 14 so that a large fraction of the total area is optically active (e.g., changes a divergence angle of incident light). In one or more embodiments, at least about 85%, or at least about 90%, or least about 95%, or at least about 98% of a total area of the structured first major surface 14 is optically active.

The lens film 12 can include any suitable material or materials, e.g., polymeric materials such as PET. In one or more embodiments, the microlenses 18 can include the same material or materials as the bulk of the lens film 12 or different materials.

Disposed adjacent to the second major surface 16 of the lens film 12 is the mask 20. As used herein, the term "mask" refers to an optical element or component that is optically opaque. A mask can be described as optically opaque when the transmittance of unpolarized visible and/or near IR light normally incident on the layer in a region between openings 22 is less than 20%, or less than 15%, or less than 10%, or less than 5%, or less than 3%, or less than 2%, or less than 1%, or less than 0.1%, or even less than 0.01%. The mask 20 can alternatively be characterized by its optical density (minus base 10 logarithm of [transmittance/100%], where the transmittance is for unpolarized normally incident visible light unless indicated differently). In one or more embodiments, between adjacent openings 22, the mask 20 has an optical density of greater than about 1.5, or greater than about 1.6, or greater than about 1.7, or greater than about 2.0, or greater than about 3.0, or greater than about 4.0. In one or more embodiments, the mask 20 can be optically absorptive so that most light incident on the mask between adjacent openings 22 is absorbed rather than reflected.

As is further described herein, the optical construction 10 can include one or more additional layers that are disposed between the mask 20 and the second major surface 16 of the lens film 12 as is further described herein. Further, in one or more embodiments, an air gap can be disposed between the mask 20 and the lens film 12. In one or more embodiments, the mask 20 can be disposed on (i.e., in contact with) the second major surface 16 of the lens film 12. Any suitable technique or techniques can be utilized to dispose the mask 20 on the lens film 12 as is further described herein.

The mask 20 includes the plurality of openings 22 disposed through the mask. In one or more embodiments, the openings 22 extend between a first major surface 28 and a second major surface 30 of the mask 20. As illustrated in FIG. 1, the first major surface 28 faces the second major surface 16 of the lens film 12.

The mask 20 can take any suitable shape or shapes and have any suitable dimensions. For example, the mask 20 can have an average thickness t of less than about 10 microns. The average thickness t of the mask 20 may alternatively be described as the average separation between a first major surface 28 and a second major surface 30 of the mask. The average refers to the unweighted mean unless indicated differently. The average thickness t can be less than about 10 microns, or less than about 9 microns, or less than about 8 microns, or less than about 7 microns, or less than about 6 microns, or less than about 5 microns, for example. The average thickness t can be greater than about 1 micron, or greater than about 2 microns, or greater than about 2.5 microns, for example. The average thickness t can be in a range of about 2 microns to about 10 microns or about 2.5 microns to about 8 microns, for example. Further, the mask 20 can include any suitable number of layers.

The mask 20 can include any suitable material or materials. In one or more embodiments, the mask 20 includes the polymer material 24. In one or more embodiments, the polymer material 24 can be at least one of a UV-cured polymer material, a visible-light-cured polymeric material, a thermal-cured polymeric material, etc. Suitable UV-cured polymer materials include acrylate and methacrylate monomers, oligomers and polymers. In one or more embodiments, acrylate or methacrylate groups can be present on other polymer systems as cross linkers, e.g., urethane acrylates, polyester acrylates, polyether acrylates, or epoxy acrylates, cyanoacrylates etc.

The mask 20 can also include optically absorptive material 26 disposed on or within the polymer material 24. In one or more embodiments, the polymer material 24 provides a polymer matrix within which the optically absorptive material 26 is disposed. The optically absorptive material 26 can include any suitable material or materials that absorb light.

In one or more embodiments, the optically absorptive material 26 can include one or more nanoparticles. Such nanoparticles can include any suitable material or materials, e.g., one or more oxides such as potassium tungsten oxide, potassium barium tungsten oxide, etc. In one or more embodiments, the material 26 can include at least one of a dye or a pigment. In general, dyes are molecular absorbers that are soluble at a molecular level, whereas pigments are insoluble and often require dispersal in a medium, e.g., a solvent or resin and often with the aid of a dispersant. Pigments can be at least one of inorganic, organic, metal-organic, or organometallic compounds. Further, pigments tend to both absorb and/or scatter light depending upon a size of the particles of the pigment. Pigments can be milled and dispersed to a certain size to obtain desired optical properties.

Pigments utilized for the optically absorptive material can be or include an organic pigment, an inorganic pigment, a metal organic pigment, or a combination thereof. In one or more embodiments, the pigment absorbs both visible and infrared (IR) light. The absorption strength of the pigment may be similar or different in the visible and infrared part of the electromagnetic spectrum. It may be preferred to have a pigment that has stronger light absorption in the visible than in the infrared to achieve sufficient visible light blocking but also have adequate absorption in the infrared for laser ablation. A suitable organic pigment is carbon black, for example. Suitable inorganic pigments are metal oxides, for example. The pigment can be a broad band absorber (e.g., carbon black).

For making a stable coating solution, carbon black may be generally uniformly dispersed with the aid of a dispersant. A dispersant can be a surfactant molecule in simple form or a polymer that has affinity both for the pigment particle as well as for the polymer resin. In one or more embodiments, the average particle size of the pigment (e.g., carbon black) is less than 1 micron, or less than 500 nm, or less than 250 nm, or less than 100 nm. For example, the average particle size can be in a range of 5 nm or 10 nm or 20 nm to 250 nm. It is possible to have a distribution of pigment particles with various sizes. The average particle size can be understood to be the Dv50 value (median particle size in a volume distribution). In one or more embodiments, pigment is included in the mask 20 at about 10 to about 35 weight percent or at about 15 to about 30 weight percent.

The optically absorptive material 26 can include visibly transparent infrared absorbing conducting oxides in the form of nanoparticle powders and dispersions, e.g., indium tin oxide (ITO), antimony tin oxide (ATO), gallium tin oxide (GTO), antimony zinc oxide (AZO), aluminum/indium doped zinc oxide, doped tungsten oxides such as cesium tungsten oxides, and tungsten blue oxides. Exemplary nanoparticles are available from Nissan Chemical, Nagase, Sumitomo Metal and Mining, and Evonik.

The optically absorptive material 26 can also include infrared absorbers with some visible colors and transmission, e.g., cobalt aluminate spinels, cobalt chromite spinels, cobalt phosphates, other transition metal spinel oxides, copper oxides, copper phosphates, $LiFePO_4$, and other iron phosphates and iron oxides, yttrium indium manganese oxides or yttrium indium manganese oxide, YInMn blue, and nanoparticles of these compositions. Further suitable infrared absorbers can include lanthanide glasses, lanthanide oxides, or lanthanide phosphates, where the lanthanide ion is selected from the lanthanide group in the periodic table. Suitable visibly transparent infrared absorbing materials further include metal borides such as lanthanum hexaborides and other lanthanide boride nanoparticles, metal nitrides, and metal oxynitrides. The optically absorptive material 26 can also include visibly transparent infrared absorbing polymer nanoparticles such as conducting polymer nanoparticles such as PEDOT-PSS.

In one or more embodiments, the optically absorptive material 26 can include non-oxide infrared absorbing nanoparticles that have some visible light transmission such as metal chalcogenides including metal sulfides, selenides such as copper sulfide and copper selenide nanoparticles, and tungsten disulfides and molybdenum disulfides.

In one or more embodiments, the optically absorbing material 26 can include visibly transparent tunable infrared absorbers such as metallic plasmonic nanoparticles that include at least one of gold, silver, copper, etc. Some metal oxides (e.g., tungsten and molybdenum "bronze" type oxides) and metal chalcogenides (e.g., copper sulfide and selenides with high electronic conductivity) also exhibit plasmonic effects. These plasmonic nanoparticles can exhibit tunable visible and IR absorption based upon their sizes and shapes.

In one or more embodiments, the optically absorptive material 26 can include visibly transparent near infrared absorbing dyes and pigments. These dyes can have low visible absorption but strong narrow band infrared absorption. Many of these dyes and pigments are organic/organometallic or metal organic in nature. Some major classes of these dyes and pigments include a diimonium dye, an anthraquinone dye, an aminium dye, a cyanine dye, a merocyanium dye, a croconium dye, a squarylium dye, a rylene dye, an azulenium dye, a polymethyne dye, a naphthoquinone dye, a pyrilium dye, a phthalocyanine dye, a naphthalocyanine dye, a naphthlolactam dye, an azo dye, an indigo dye, a perinone dye, a terrylene dye, a dioxadine dye, a quinacridone dye, an isodorynone dye, a quinophthalone dye, a pyrrol dye, or a thioindigo dye, transitional metal dithioline dye, quinone dye, anthraquinone dye, iminium dye, thiapyrilium dye azulenium dye, and indoaniline dye. Many of these dyes and pigments can exhibit both visible and infrared absorption as well.

Further, in one or more embodiments, the optically absorptive material 26 can include visible dyes and colorants that exhibit IR transparency that fall into one or more classes such as acid dyes, azoic coloring materials and coupling components, diazo components, basic dyes that include developers such as direct dyes, disperse dyes, fluorescent brighteners, food dyes, ingrain dyes, leather dyes, mordant dyes, natural dyes and pigments, oxidation bases, pigments, reactive dyes, reducing agents, solvent dyes, sulfur dyes, condense sulfur dyes, and vat dyes. Suitable organic dyes belong to one or more monoazo, azo condensation, insoluble metal salts of acid dyes, and diazo, naphthols, arylides, diarylides, pyrazolone, acetoarylides, naphthanilides, phthalocyanines, anthraquinone, perylene, flavanthrone, triphendioxazine, metal complexes, quinacridone, and polypryrrolopyrrole dyes.

In some other embodiments, the optically absorptive material 26 can include dyes or pigments which show increased transmission in 300-500 nm wavelengths for example violet pigments such as perylene pigments. The high transmission in the 300-500 nm wavelength allows ease of UV or blue light cure for acrylate systems containing these coatings even at high optical densities which can be a slow process for UV/Vis absorbing pigments like carbon black where both high photoinitiator amounts and multiple cure steps and/or UV lamps are needed.

In one or more embodiments, the optically absorptive material 26 can include metal oxide pigments such as metal chromates, molybdates, titanates, tungstates, aluminates and ferrites. Many contain transition metals such as iron, manganese, nickel, titanium, vanadium, antimony, cobalt, lead, cadmium, chromium etc. Bismuth vanadates are non-cadmium yellows. These pigments can be milled to create nanoparticles that can be useful where transparency and low scattering is desired. These oxides may exhibit selective visible and/or infrared absorption. Further suitable metal oxide pigments include carbon black, activated charcoal, and lamp black, which exhibit both visible and IR absorption.

In general, electromagnetic absorption characteristics of the mask 20 can be selected using any suitable technique or techniques. For example, the types of materials utilized for the optically absorptive material 26 can be selected to provide for selected infrared absorption for forming the openings 22 by laser ablation using an infrared light source while also providing the desired light absorption of the mask 20. Further, the optically absorptive material 26 and other materials utilized in the mask 20 can be selected to provide a desired viscosity or range of viscosities. In one or more embodiments, the composition utilized to form the mask 20 can have a viscosity of at least 200 cP and no greater than 1000 cP.

The mask 20 can be manufactured using any suitable technique or techniques. For example, the UV-curable polymer 24 and an optically absorptive material 26 can be combined to make a coating mixture. Suitable coating mixtures include printing inks. Sun Chemicals, Dainichiseika Color and Chemicals Mfg Co, Ltd, Huber Group, for example, make useful inks containing carbon black. These printing inks can have different viscosities based on polymer choice, molecular weight of polymers, as well as the solid content. Various inks can be chosen based on the coating or printing methods. In one or more embodiments, the printing ink is applied via die coating. Other coating or printing methods such as gravure or flexographic printing can alternatively be used. The choice of coating or printing method may also depend on the desired thickness of the layer to be printed or coated.

The mask 20 can be disposed adjacent to the second major surface 16 of the lens film 12 using any suitable technique or techniques, e.g., ink-jet printing (e.g., UV ink-jet printing), coating, flexoprinting (e.g., UV flexoprinting), etc. Other methods can involve solvent coating followed by UV curing.

The mask 20 can include any additional material or materials, e.g., solvents, light scattering materials, photoinitiators that are adapted to absorb blue light or UV light. Any suitable solvents can be utilized, e.g., ketones, alcohols, esters, glycol esters, glycol ethers, hydrocarbons, glycol ether esters. Generally high vapor pressure, low boiling solvents are preferred but higher boiling solvents are added to the blend to improve processing and improve cosmetics of the coating. Further, any suitable light scattering materials can be utilized, e.g., metal oxides such as silica, titania, zirconia, tin oxide, etc. The particle size, amount, and refractive index of these materials can affect the opacity as well as the UV-cure of the mask 20.

Figure 3:
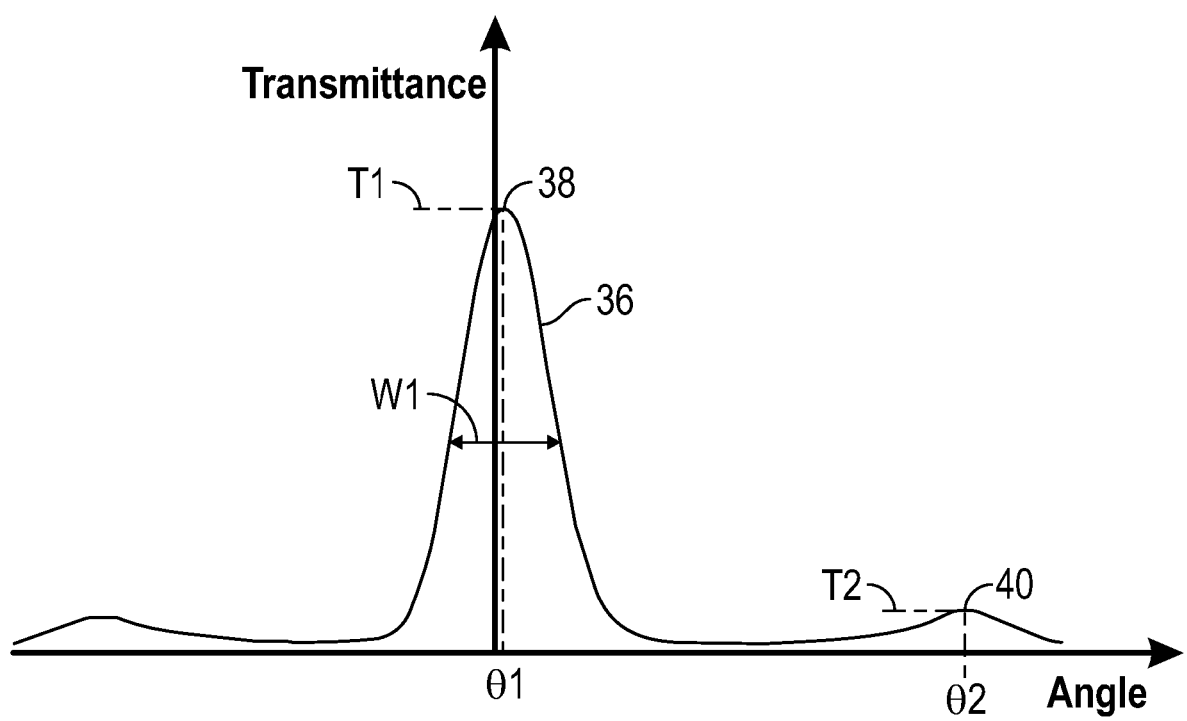
FIG. 3 is a schematic plot of optical transmittance through an optical construction.

Disposed through the mask 20 are the plurality of openings 22. Such openings 22 can be formed using any suitable technique or techniques, e.g., laser ablation. The openings 22 can be disposed in any suitable pattern or arrangement through the mask 20 and can include any suitable number of openings. In one or more embodiments, the openings 22 are aligned to the microlenses 18 in a one-to-one correspondence such that for a substantially collimated light 32 incident on the structured first major surface 14 side of the optical construction 10 along an incident direction 34 forming an incident angle φ with the second major surface 16 (incident angle is the angle relative to the surface normal), an optical transmittance 36 (FIG. 3) of the optical construction as a function of an incident angle includes a first transmitted peak 38 having a first peak transmittance T1 and a corresponding full width at half maximum W1. The substantially collimated light 32 can be collimated or nominally collimated or can have a divergence angle or convergence angle less than about 20 degrees, or less than about 10 degrees, or less than about 5 degrees, for example. The substantially collimated light 32 can fill or substantially fill at least one microlens 18 or can fill or substantially fill the plurality of microlenses. The incident direction can be substantially orthogonal to the first and second directions. For example, the angle φ can be less than about 20 degrees, or less than about 10 degrees, or less than about 5 degrees. As shown in the embodiment illustrated in FIG. 5, the angle φ of substantially collimated light 132 is about 0 degrees. In one or more embodiments, the first transmitted peak 38 is within about 10 degrees of the incident angle (e.g., the first transmitted peak 38 can be at a first transmitted angle θ1 that can be within 10 degrees of the angle φ). In one or more embodiments, T1≥40% or T1≥50%. In one or more embodiments, T1/W1≥2%/degree, or T1/W1≥4%/degree, or T1/W1≥6%/degree, or T1/W1≥8%/degree. Further, in one or more embodiments, T1≥50% and T1/W1≥4%/degree. Typically, a sharp peak (e.g., T1/W1 of 4%/degree or higher) may be preferred. In one or more embodiments, W1 is less than about 20, or 15, or 12, or 10 degrees. In one or more embodiments, T1 is greater than about 50% or greater than about 55%. In one or more embodiments, 70%≥T1≥50%. For example, optical constructions with 70%≥T1 may be preferred in some cases since the cross-talk is typically smaller for such optical constructions than for optical constructions having a higher T1, while optical constructions with T1≥50% may be preferred in some cases to provide a desired throughput of incident light.

The substantially collimated light 32 can include any suitable wavelength or wavelengths. In one or more embodiments, the light 32 can be visible light (e.g., wavelengths from about 400 nm to about 700 nm) or can have at least one wavelength in a visible wavelength range. In one or more embodiments, the optical transmittance 36 is an average optical transmittance over a wavelength range extending from at least about 450 nm to about 650 nm. In one or more embodiments, the optical transmittance 36 is an optical transmittance for at least one wavelength in a wavelength range extending from about 450 nm to about 650 nm (e.g., the optical transmittance can be for a wavelength of about 530 nm).

In one or more embodiments, the optical construction 10 is adapted to transmit light incident along the incident direction and to substantially not transmit light incident along a direction that forms an angle greater than about 15 degrees with the incident direction. The incident angle φ can be about zero degrees or can be greater than zero degrees depending on the incident angles which are desired to be transmitted.

In one or more embodiments, the optical transmittance 36 of the optical construction 10 further includes a second transmitted peak 40 having a second peak transmittance T2 at a transmitted angle θ2 greater than the incident angle (e.g., φ) by at least about 30 degrees. In one or more embodiments, T2≤3%, or T2≤2.5%, or T2≤2%, or T2≤1.5%, or T2≤1%, or T2≤0.5%, or T2≤0.3%. In one or more embodiments, T2/T1 is less than about 0.07, or less than about 0.05. In one or more embodiments, 0.3%≤T2≤3% or 0.5%≤T2≤2.5%. A second peak transmittance T2≥3% is typically undesired as this can result in undesired cross-talk. In one or more embodiments, the second peak 40 is not present or is too small to be discerned in a plot of the optical transmittance versus transmitted angle. The second peak 40 may be present for angles along a first direction (e.g., a down-web direction) but not along an orthogonal second direction (e.g., a cross-web direction). This may result from shape variations in the microlenses arising from the process (e.g., a cast and cure process) used to form the microlens film.

In one or more embodiments, in at least a first cross-section of the outermost structured first major surface 14 in a direction substantially orthogonal to the first and second directions and substantially bisecting a first opening 22-1 in the plurality of openings 22, the first opening has a larger first width d1 on the first major surface 28 of the mask 20 facing the lens film 12 and a smaller second width d2 on the second major surface 30 of the mask facing away from the lens film. In one or more embodiments, the first width d1 is smaller than the second width d2. In one or more embodiments, d1 and d2 are about equal. The relative widths of d1 and d2 may depend on material choice for the mask 20 and on laser ablation processing conditions. Adjusting shapes of openings via laser processing conditions is generally described in U.S. Pat. No. 7,864,450 (Segawa et al.), for example. In one or more embodiments, a ratio (d1/d2) of the first width d1 to the second width d2 is in a range of about 1.1 to about 2.

The openings 22 can have any suitable average diameter, e.g., an average diameter in a range of about 1 micron to about 10 microns, or about 2 microns to about 8 microns. The diameter d0 of an opening 22 can be understood to be the diameter of a cylinder having a length equal to the thickness t and having a volume equal to the volume of the opening (e.g., the diameter d0 may be about equal to (d1+d2)/2 in FIG. 1). The average diameter is the diameter d0 averaged (unweighted mean) over the openings 22. The average of d1 or the average of d2 may also or alternatively be specified. In one or more embodiments, for at least one of the first and second major surfaces 28, 30 of the mask 20, the open ends at the major surface (e.g., open ends 23 at the first major surface 28 or open ends 25 at the second major surface 30) have an average diameter in a range of about 1 micron to about 10 microns, or about 2 microns to about 8 microns. The diameter of an open end can be understood to be the diameter of a circle having a same area as the open end. The average diameter of the open ends is diameter averaged (unweighted mean) over the open ends. In one or more embodiments, 0.5≤d/t≤2, where d is the average d0, d1, or d2 and t is the average thickness of the mask layer.

Figure 4:
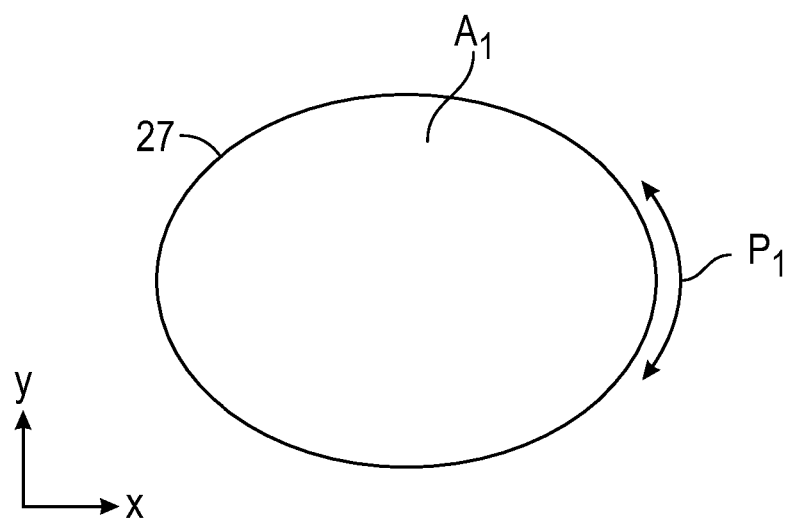
FIG. 4 is a schematic view of an illustrative open end of an opening of an optical construction.

In one or more embodiments, each opening 22 in at least a substantial fraction (e.g., at least about 20%) of the openings has at least one open end having a high circularity (e.g., at least about 0.75, or at least about 0.8, or at least about 0.85). The circularity (C) of a shape is $4\pi$ times an area $A_1$ of the shape divided by a square of a perimeter $P_1$ of the shape (i.e., $C=4\pi A_1/P_1^2$). The circularity, which is also referred to as the isoperimetric ratio, is 1 for a circle and less than 1 for any other shape (by a mathematical result known as the isoperimetric inequality). Circularity is a commonly used parameter to describe how close to a circle an object is and is often determined automatically by software in a digital camera, for example. FIG. 4 is a schematic view of a shape 27 of an open end (e.g., open end 23 at the first major surface 28 or open end 25 at the second major surface 30 of the mask 20) of an opening 22. The shape 27 has an area $A_1$ and a perimeter $P_1$ (length around the area $A_1$). The geometry of the open ends 25 at the second major surface 30 of the mask 20 can be determined from a microscope image of the second major surface 30 (see, e.g., FIGS. 13-14). The geometry of the open ends 23 at the first major surface 28 can be determined by first coating the microlenses 18 with an index matching coating to substantially planarize the first major surface 14 of the lens film 12. The open ends 23 at the first major surface 28 of the mask 20 can then be determined from a microscope image of the first major surface 28 viewed through the planarizing layer and the lens film 12.

In one or more embodiments, for at least one major surface 28, 30 of the mask 20, each opening 22 has an open end at the major surface (open end 23 at the first major surface 28 and/or open end 25 at the second major surface 30). In one or more embodiments, the circularities of the shapes 27 of the open ends of at least about 20% of the openings 22 is at least about 0.75. In one or more embodiments, the areas of the shapes 27 of the open ends of the openings 22 have an average A (e.g., the unweighted mean of the areas $A_1$ can be A) and a standard deviation (e.g., standard deviation of the areas $A_1$) of less than about 15% of A. In one or more embodiments, the standard deviation is less than about 12% of A, or less than about 10% of A, or less than about 8% of A.

In one or more embodiments, the at least about 20% of the openings 22 include at least about 50%, or at least about 60%, or at least about 70%, or at least about 80%, or at least about 90% of the openings. In one or more embodiments, the circularities of the shapes of the open ends of the at least about 20% of the openings 22 is at least about 0.8, or at least about 0.85, or at least about 0.9. In one or more embodiments, the circularities of the shapes of the open ends of at least about 50% of the openings 22 is at least about 0.75, or at least about 0.8, or at least about 0.85. In one or more embodiments, the circularities of the shapes of the open ends of at least about 70% of the openings 22 is at least about 0.75, or at least about 0.8, or at least about 0.85. In one or more embodiments, the circularities of the shapes 127 of the open ends of the openings 22 have an average of at least about 0.75, or at least about 0.8, or at least about 0.85 and a standard deviation of less than about 0.2. In one or more embodiments, the standard deviation is less than about 0.18 or less than about 0.16 or less than about 0.14.

Figure 5:
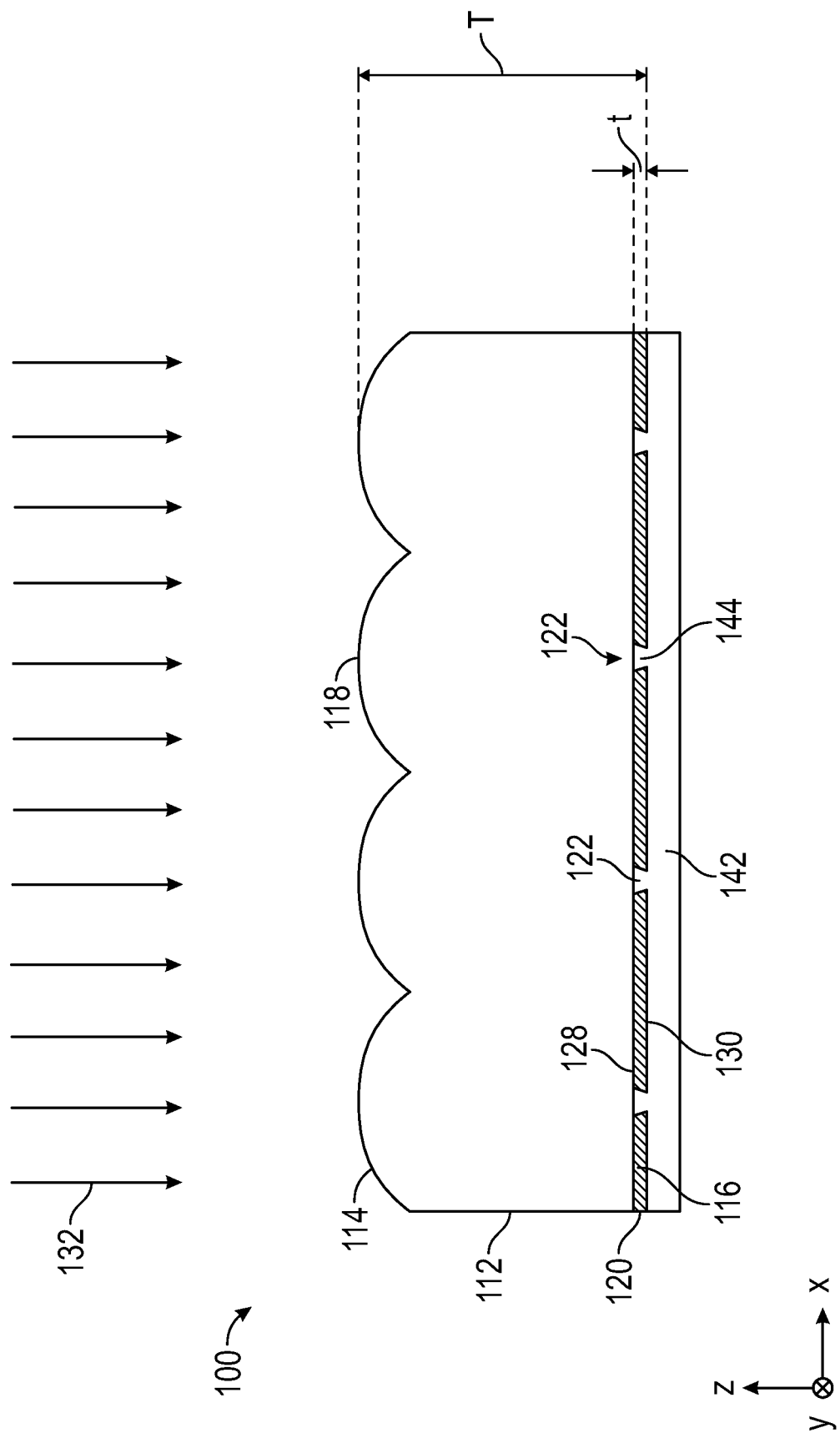
FIG. 5 is a schematic cross-section view of another embodiment of an optical construction.

As mentioned herein, the optical construction 10 can include one or more additional layers that provide at least one structural or optical property to the construction. For example, FIG. 5 is a schematic cross-section view of another embodiment of an optical construction 100. All of the design considerations and possibilities described herein regarding the optical construction 10 of FIGS. 1-4 apply equally to the optical construction 100 of FIG. 5. The optical construction includes a lens film 112 having an outermost structured first major surface 114 and an opposing outermost substantially planar second major surface 116. The lens film 112 can include any suitable lens film described herein, e.g., lens film 12 of FIG. 1. The structured first major surface 114 includes a plurality of microlenses 118. The construction 100 further includes a mask 120 disposed adjacent to the second major surface 116 of the lens film 112. The mask 120 can include any suitable mask described herein, e.g., mask 20 of FIG. 1. Further, the mask includes a first major surface 128 and a second major surface 130. A plurality of openings 122 are disposed through the mask 120.

One difference between construction 100 of FIG. 5 and construction 10 of FIGS. 1-4 is that construction 100 includes one or more optional additional layers or films. For example, optical construction 100 includes optional additional layer 142 disposed adjacent to the second major surface 130 of the mask 120 opposite the lens film 112. The additional layer 142 can include any suitable material or materials, e.g., adhesives. Further, the additional layer 142 can have any suitable dimensions. Although depicted as a single layer, the additional layer 142 can include two or more sublayers that are connected together using any suitable technique or techniques.

In one or more embodiments, material 144 (e.g., polymeric material and/or a low index optical adhesive material) from the layer 142 at least partially fills some or all of the openings 122 (e.g., the layer 142 can cover substantially the entire mask 120 so that all of the openings are at least partially filled, or the layer can be disposed over only a portion of the mask so that only some of the openings are at least partially filled). In one or more embodiments, the mask 120 has a first refractive index (the refractive index of the material forming the mask), and at least some of the openings 122 are at least partially filled with the polymeric material 144 having a second refractive index. In one or more embodiments, a real part of the second refractive index is less than a real part of the first refractive index. For example, in one or more embodiments, the real part of the first refractive index minus the real part of the second refractive index is at least about 0.05. In one or more embodiments, the real part of the first refractive index can be less than the real part of the second refractive index. Refractive indices can be understood to be determined at a wavelength of 532 nm except where indicated differently.

In one or more embodiments, the material 144 in the openings 122 is air or an optically transparent material. In one or more embodiments, each opening 122 in at least a majority of the openings has an optical density less than about 0.3, or less than about 0.2, or less than about 0.15, or less than about 0.1. In one or more embodiments, between adjacent openings 122, the mask 120 has a substantially uniform optical density of greater than about 1.5. Substantially uniform optical density refers to optical density that is uniform to a good approximation on a length scale of about 1 micron. For example, each cylindrical region through the mask 120 between openings having a diameter of about 1 micron can have an optical density within about 15% or within about 10% or within about 5% of an average optical density of such regions. In one or more embodiments, a mask having a substantially uniform optical density is obtained by using optically absorptive particles (e.g., carbon black particles or perylene black pigment particles) having an average diameter substantially smaller than 1 micron (e.g., less than about 250 nm) and substantially uniformly dispersed in the layer at a loading sufficiently high that an average center to center spacing between the particles is less than about 1 micron.

Figure 6:
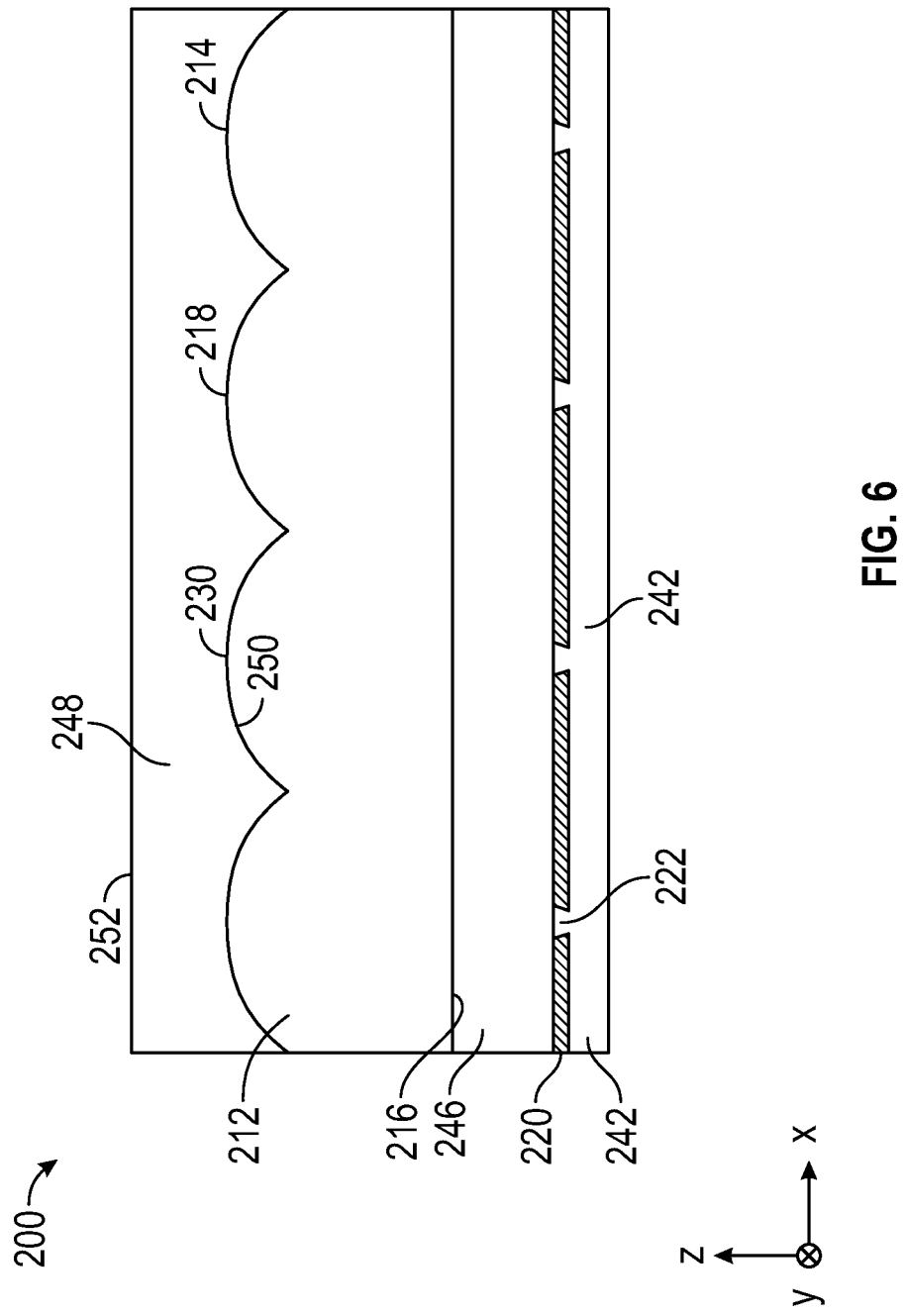
FIG. 6 is a schematic cross-section view of another embodiment of an optical construction.

Further, FIG. 6 is a schematic cross-section view of another embodiment of an optical construction 200. All of the design considerations and possibilities described herein regarding the optical construction 10 of FIGS. 1-4 and the optical construction 100 of FIG. 5 apply equally to the optical construction 200 of FIG. 6. The optical construction 200 includes a lens film 212 having a plurality of lenses 218 disposed on a first major surface 214 of the lens film, a mask 220 disposed adjacent to a second major surface 216 of the lens film, and an additional layer 242 disposed adjacent to a second major surface 230 of the mask. The additional layer 242 can include any suitable additional layer described herein, e.g., additional layer 142 of FIG. 5.

One difference between optical construction 200 of FIG. 6 and construction 10 of FIGS. 1-4 and construction 100 of FIG. 5 is that construction 200 includes a layer or film 246 that is disposed between the lens film 212 and the mask 220. The layer or film 246 can be a wavelength selective layer or film. For example, the layer or film 246 can include dye(s) and/or pigment(s) that absorb in some wavelength range(s) and not others. As another example, the layer 246 can be a multilayer optical film reflecting in some wavelength range(s) and not others. As is known in the art, multilayer optical films including alternating polymeric layers can be used to provide desired reflection and transmission in desired wavelength ranges by suitable selection of layer thicknesses.

Multilayer optical films and methods of making multilayer optical films are described, e.g., in U.S. Pat. No. 5,882,774 (Jonza et al.); U.S. Pat. No. 6,179,948 (Merrill et al.); U.S. Pat. No. 6,783,349 (Neavin et al.); U.S. Pat. No. 6,967,778 (Wheatley et al.); and U.S. Pat. No. 9,162,406 (Neavin et al.). In one or more embodiments, the layer 246 is substantially transmissive for a visible wavelength range (e.g., about 450 to about 650 nm) and a near infrared wavelength range (e.g., 900 to 1000 nm). In one or more embodiments, the layer 246 absorbs or reflects in at least a portion of a wavelength range from about 650 nm to about 900 nm, for example.

Another difference between optical construction 200 and constructions 10 and 100 is that construction 200 includes a layer 248 that is disposed on the structured first major surface 214 of the lens film 212. The layer 248 can have a major surface 250 that substantially conforms to the structured major surface 214 and an opposite substantially planar major surface 252. In other words, the layer 248 can substantially planarize the structured first major surface 214. The layer 248 can be a low index layer. In one or more embodiments, the layer 248 has a refractive index less than about 1.4, or less than about 1.35, or less than about 1.3, or in a range of about 1.1 to about 1.35 or to about 1.3, for example. In one or more embodiments, the layer 248 can have a refractive index at least 0.1, or at least 0.2, or at least 0.3 lower than that of the lens film 212. The low index layer may be a nanovoided layer as described, e.g., in U.S. Patent Publication Nos. 2013/0011608 (Wolk et al.) and 2013/0235614 (Wolk et al.), for example.

In one or more embodiments, any one, two, or all three of elements 142 of FIG. 5 and elements 242, 246, and 248 of FIG. 6 can be omitted. In one or more embodiments, layer or film 246 is omitted and layer 142/242 includes dye(s) and/or pigment(s) that absorb in some wavelength range(s) and not others.

Figure 7:
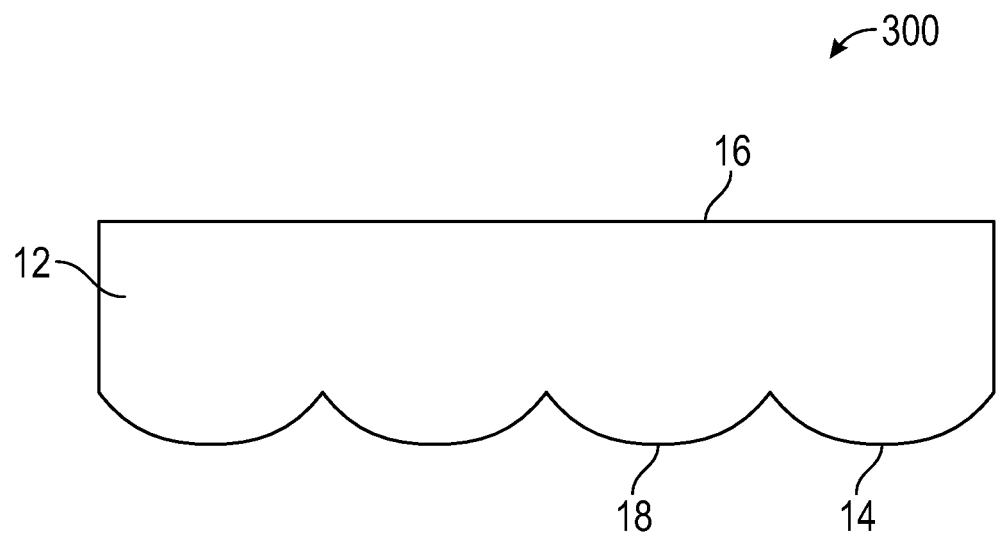
FIG. 7 is a schematic cross-section view of a step of a method of forming the optical construction of FIG. 1.
Figure 8:
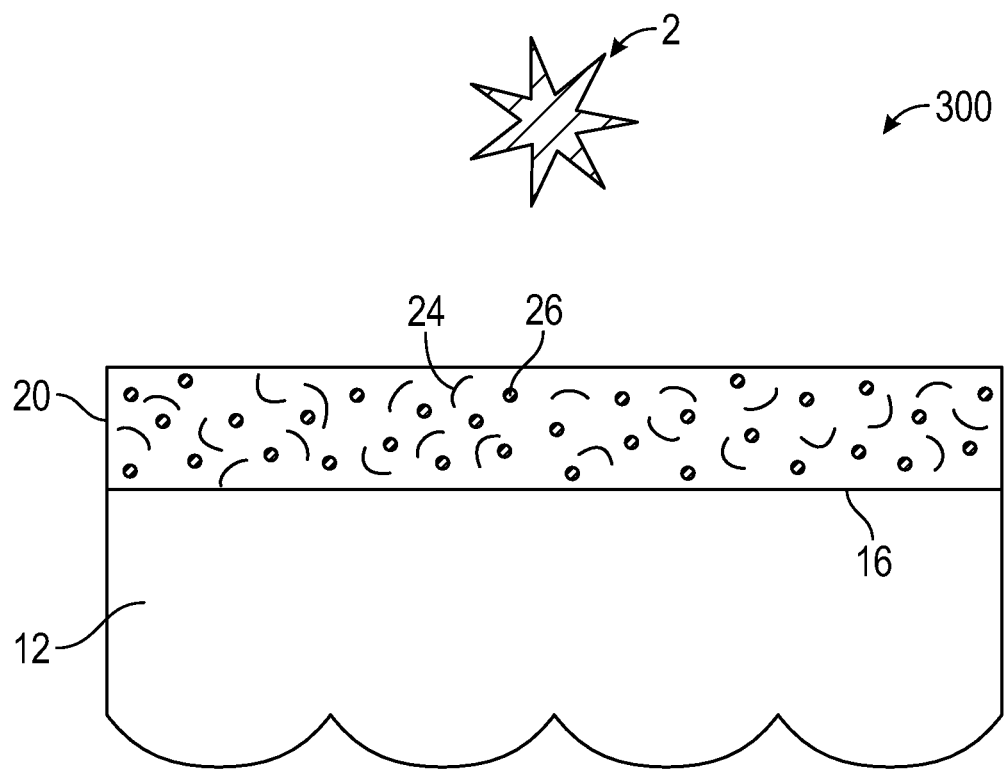
FIG. 8 is a schematic cross-section view of another step of the method of FIG. 7.
Figure 9:
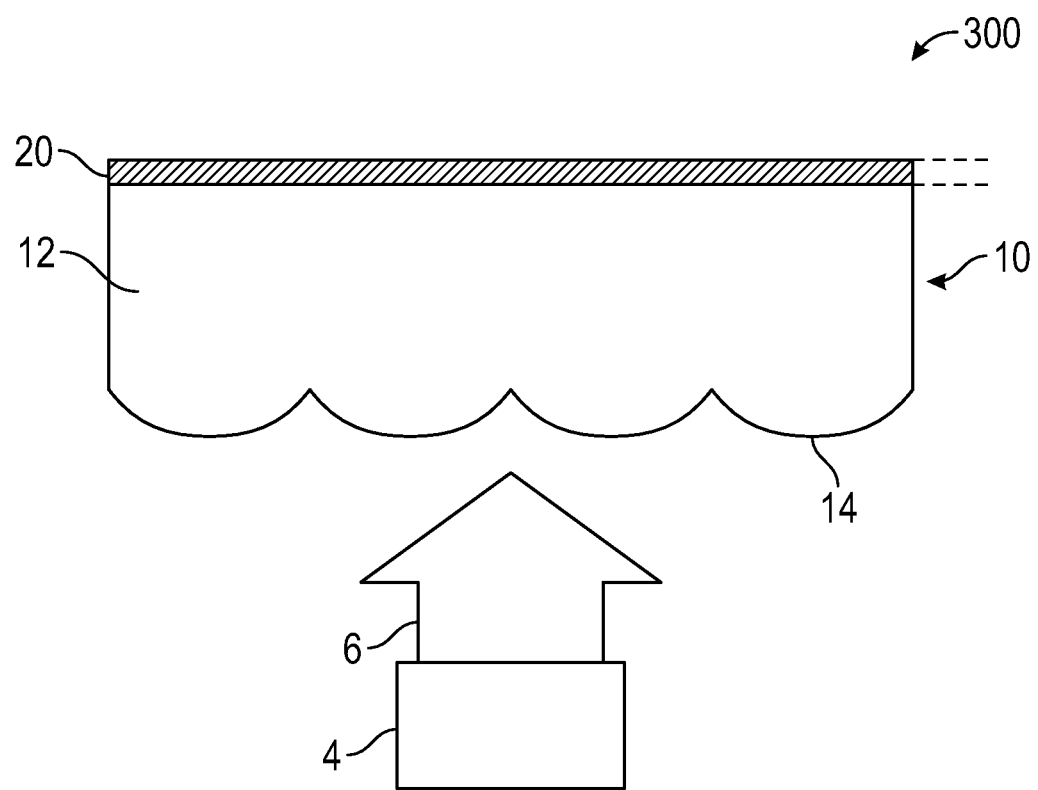
FIG. 9 is a schematic cross-section view of another step of the method of FIG. 7.

The various embodiments of optical constructions described herein can be manufactured using any suitable technique or techniques. For Example, FIGS. 7-9 are schematic illustrations of one embodiment of a method 300 of making optical construction 10. Although described regarding optical construction 10 of FIGS. 1-4, the method 300 can be utilized to manufacture any suitable optical construction. As shown in FIG. 7, the method 300 includes disposing the plurality of microlenses 18 on the first major surface 14 of the lens film 12 using any suitable technique or techniques, e.g., embossing.

In FIG. 8, the method 300 includes disposing the mask 20 adjacent to the second major surface 16 of the lens film 12 using any suitable technique or techniques, e.g., ink jet printing. In one or more embodiments, the mask 20 is disposed on the second major surface 16 of the lens film 12. Further, in the illustrated embodiment, the mask 20 includes the UV-curable polymer material 24 and optically absorptive material 26. The UV-curable polymer material 24 can be cured using any suitable technique or techniques. In one or more embodiments, a UV light source 2 directs UV light to the mask 20 to cure the UV-curable polymer material. Any suitable UV light source can be utilized.

In FIG. 9, the method 300 further includes disposing the plurality of openings 22 through the mask 20 using any suitable technique or techniques. In one or more embodiments, a source 4 (e.g., laser) emits light 6 such that it is incident upon the structured first major surface 14 of the lens film 12 and is focused by the lenses onto the mask 20, i.e., the mask is irradiated through the plurality of microlenses 18 to form the plurality of openings 22. Any suitable light 6 can be emitted by the source, e.g., infrared light. The light 6 ablates selected portions of the mask 20 to form the openings 22. In one or more embodiments, the openings 22 that are formed by the light 6 are arranged along first and second directions and are aligned to the microlenses 18 of the plurality of microlenses in a one-to-one correspondence. In one or more embodiments, the UV-curable material 24 of the mask 20 is cured prior to disposing the plurality of openings 22 through the mask 20.

The light 6 can have wavelengths in a range described elsewhere herein (e.g., 1020 nm to 1100 nm). The light 6 can have a wavelength at a peak intensity of about 1064 nm, for example. The light 6 can have a beam diameter that fills or substantially fills at least one microlens 18. The optically absorptive material 26 of the mask 20 can be optically absorptive for the wavelength range of the light 6. In one or more embodiments, the light 6 emitted by the source 4 can include infrared light, and the optically absorptive material 26 can be optically absorptive for the wavelength range of the infrared light and for a visible wavelength range so that the optically absorptive material absorbs the infrared light for ablation to occur and provides the desired optical density for the resulting mask 20. In one or more embodiments, each opening 22 in at least a majority of the openings has an optical density less than about 0.3 or an optical density in any of the ranges described elsewhere herein for an opening. The resulting optical construction 10 can have an optical transmittance as described elsewhere and/or can have openings 22 having open ends having a circularity and/or area distribution (e.g., average area and standard deviation of the area) as described further elsewhere.

The openings 22 can be created using a coherent, pulsed source 4 (e.g., laser) with wavelengths from 400 nm-1200 nm, or from 500 nm-1100 nm, or from 1000 nm-1100 nm, or from 1020 nm to 1100 nm. For example, the source 4 can be a doped fiber laser that produces a near infrared (NIR) band having wavelengths from about 1020 nm to about 1100 nm. A wide range of lasers can be used for the source 4. Suitable lasers include Nd:YAG lasers, fiber lasers, and diode lasers, for example. $1^{st}$, $2^{nd}$, or $3^{rd}$ harmonics may be used, for example. The desired wavelength range of the source 4 may depend on the polymer and optically absorptive material used in the mask 20.

Figure 10:
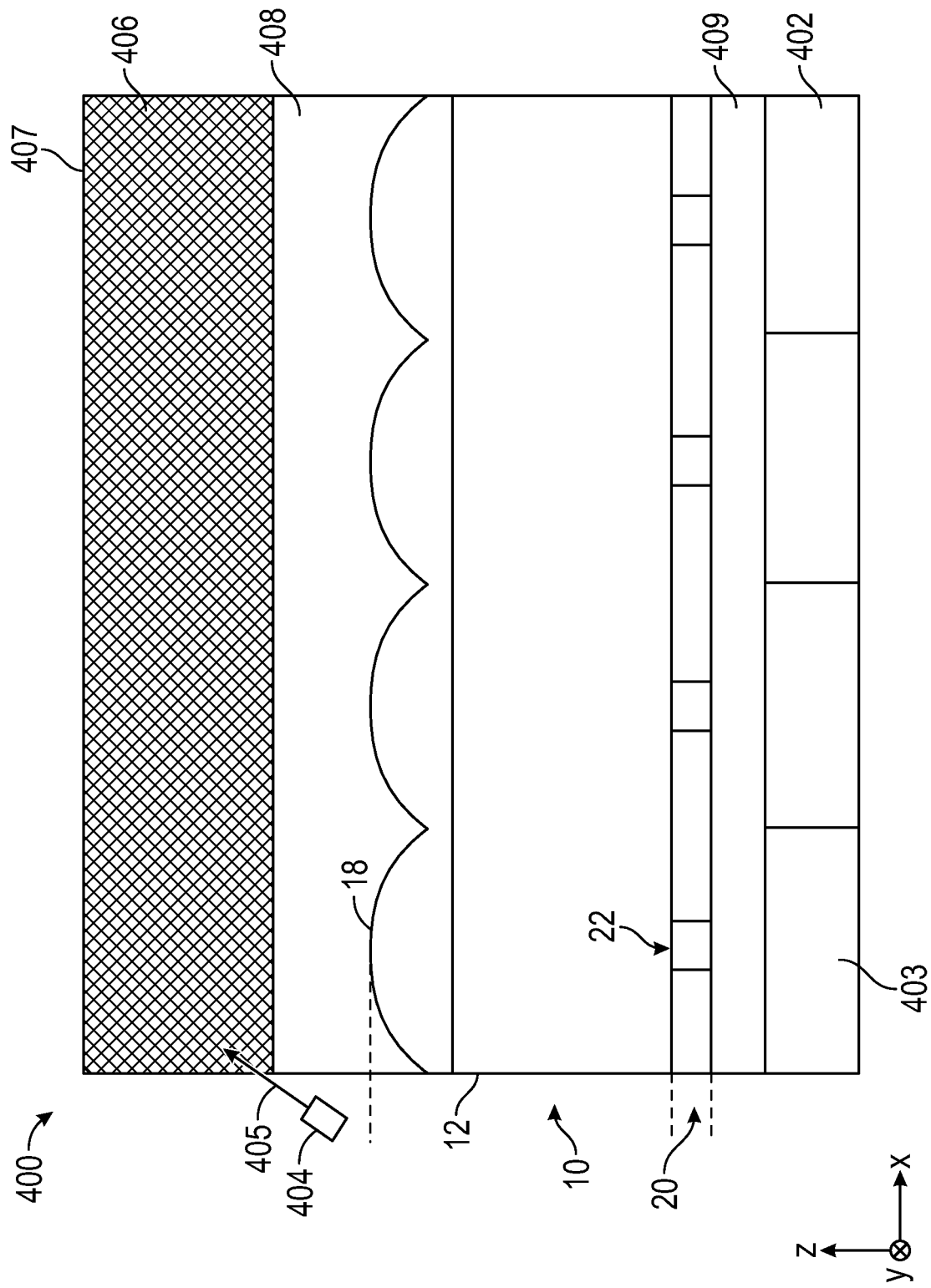
FIG. 10 is a schematic cross-section view of an electronic device that includes the optical construction of FIG. 1.

As mentioned herein, the various embodiments of optical constructions can be utilized with any suitable device, assembly, or system. For example, FIG. 10 is a schematic cross-section view of one embodiment of an electronic device 400. The device 400 can include the optical construction 10 of FIGS. 1-4 and a sensor 402 disposed adjacent to the optical construction such that the mask 20 is disposed between the lens film and the optical sensor. As used herein, the phrase "adjacent to the optical construction" means that the sensor 402 is disposed such that light that is transmitted through the second major surface 30 of the mask 20 is incident upon the sensor 402. Although depicted as including optical construction 10 of FIGS. 1-4, the device 400 can include any suitable optical construction. The device 400 can also include a light source 404 in optical communication with the optical sensor 402, and a display 406 disposed such that the optical construction 10 is disposed between the optical sensor 402 and the display. As used herein, the term "optical communication" means that light 405 emitted by the source 404 can be received by the sensor 402 whether such light is directly or indirectly incident upon the sensor. The light source 404 can include any suitable source, e.g., an infrared light source, a visible light source, etc.

The display 406 extends along the first (x-axis) and second (y-axis) directions. The display 406 can include any suitable display. In one or more embodiments, the display 406 can be an emissive display that includes a plurality of pixels configured to generate and emit light. In one or more embodiments, the display 406 can be an organic light emitting diode (OLED) display, or a liquid crystal display (LCD). In one or more embodiments, the display 406 can be a semi-transparent display panel that allows at least some light to be transmitted through the display. In one or more embodiments, the optical construction 10 can be bonded to the display 406 using a first adhesive layer 408 (e.g., optical clear adhesive layer). The first adhesive layer 408, in some instances, may have an index of refraction of less than about 1.3 for at least one visible wavelength.

Disposed opposite the display 406 is the optical sensor 402. The optical construction 10 can be disposed between the display 406 and the optical sensor 402. In one or more embodiments, the optical construction 10 can be bonded to the optical sensor 402 using a second adhesive layer 409 (e.g., optical clear adhesive layer). In one or more embodiments, the optical sensor 402 can include a plurality of sensor pixels 403 aligned to the plurality of microlenses 18 and the openings 22 in a one-to-one correspondence.

The light source 404 can be any suitable source or sources, e.g., an infrared light source. Such infrared source 404 can be infrared light from the sun, or room heaters that emit infrared light, etc. The source 404 is disposed to emit light 405 toward a front surface 407 of the display 406.

In one or more embodiments, the optical sensor 402 can be configured to detect a fingerprint, and the electronic device 400 including the optical construction 10 can be configured to determine if a detected fingerprint matches a fingerprint of an authorized user. In such embodiments, light 405 from the source 404 can be incident, e.g., on a fingerprint of a user and directed through the optical construction 10, where the lenses 18 focus the light through openings 22 and to the sensor 402. Light that is not directed through openings 22 can be absorbed by the mask 20. Various sources can direct light to the mask 20 to be absorbed, e.g., ambient light or light from the display 406 that is not directed from the fingerprint of the user and would, therefore, reduce a signal-to-noise ratio of the sensor 402.

In one or more embodiments, the device 400 can be included in a biometric or bioanalytic assembly (e g., optically determines hemoglobin concentration), and/or a molecular analysis assembly (e.g., optically determines blood glucose levels).

EXAMPLES

All parts and percentages in the Examples are by weight unless indicated otherwise.

Hardcoat Premix

A Hardcoat Premix was made by combining 33 g of monomer blend (50/50 weight mix of HDODA/PETA (SR238/SR295 from Sartomer, Exton, PA) with 65 g of MEK (Methylethyl ketone), 1 g of IRGACURE 819, and 1 g of IRGACURE 184 (BASF, Florham Park, New Jersey).

Visible Pigment Dispersion 1

Visible Pigment Dispersion 1 was made by dissolving 77.5 g of Solplus D510 (Lubrizol, Wickliffe, OH) in 300 g of MEK. Further, 51 g of Lumogen FK4280 (BASF) was added slowly until all pigment was wetted, then the mixture was allowed to mix for 30 minutes. The mixture was transferred to a Minicer bead mill and milled using a 0.2 mm YTZ milling media. Milling continued for 2 hours and the resulting dispersion was diluted to measure the particle size.

IR Dispersion 1

IR Dispersion 1 is a dispersion of potassium barium tungsten oxide nanoparticles in MEK and was made by the process described in Example EX-3 of PCT Publication WO 2020/016755 A1 to Sharma et al.

IR Dispersion 2—Hardcoat Blend

IR Dispersion 2—Hardcoat Blend was made by mixing the following components in an amber jar and homogenizing them:

316 g of IR Dispersion 2, which is a dispersion of potassium tungsten oxide nanoparticles in Dowanol (Dow Chemical Company, Midland, MI) and was made by the process described in Example CE-B of PCT Publication WO 2020/016755 A1 to Sharma et al.

300 g of Hardcoat Premix (36.7%, solids)

175 g of 60 wt % solution of monomer blend (50/50 weight mix of HDODA/PETA (Sartomer SR238/SR295)) in MEK.

IR Dispersion 3

IR Dispersion 3 was made using 50 g of YMF-02A cesium tungsten oxide nanoparticle dispersion (Sumitomo Metal and Mining Co, Japan) that was combined with 36 g of HDODA (SR238, Sartomer, USA) and 0.1 g of Prostab 5198. The solvent was removed using a rotary evaporator in vacuum. The resulting dispersion was stable, and the oxide content was analyzed by calcining the dispersion to yield a 20 wt % oxide (Cesium tungsten oxide) in HDODA.

Coating Solution 1

2 g of Hardcoat Premix described above was combined with 0.2 g of Microlith violet 5700K (BASF) in a glass vial. To this mixture 1.5 g of IR Dispersion 1 was added, and the resulting mixture was homogenized using a vortex mixer.

Coating Solution 2

Coating Solution 2 was manufactured by combining 2 g of IR Dispersion 2—Hardcoat Blend, 0.25 g of Visible pigment Dispersion 1, and 0.25 g of Hardcoat Premix in a glass vial, and the mixture was homogenized using a vortex mixer.

Coating Solution 3

Coating Solution 3 was manufactured by mixing 1.4 g of Coating Solution 2 described above with 0.18 g of Visible pigment Dispersion 1 and 0.18 g of Hardcoat Premix in a glass vial, and the mixture was homogenized using a vortex mixer.

Coating Solution 4

Coating Solution 4 was manufactured by combining 1 g of IR Dispersion 3 with 0.5 gm of Visible Pigment Dispersion 1 and 1.3 g of Hardcoat Premix in a glass vial. The mixture was homogenized using a vortex mixer.

Coating Solution 5

Coating solution 5 was manufactured by combining 1 g of Visible dispersion 1 with 1 g of Hardcoat premix in a glass vial. The mixture was homogenized using a vortex mixer.

Examples 1-10

Examples 1-10 of masks were prepared by Meyer rod coating on clear PET and a separate set on microlens films using the coating solutions described above. Both sets were dried in air first and then cured using a UV Fusion System H Bulb at 60% power at the belt speed of 50 fpm. Two passes were made through the lamp to ensure complete cure. The samples, coating solutions, and substrate information is detailed in Table 2.

TABLE 2

| Example No. | Coating Soln No. | Substrate | Meyer Rod # | VLT (Visible Light Transmission) |
|---|---|---|---|---|
| 1 | 1 | Microlens | 12 | |
| 2 | 1 | PET | 12 | 12 |
| 3 | 1 | Microlens | 20 | |
| 4 | 1 | PET | 20 | 3 |
| 5 | 2 | Microlens | 12 | 14 |
| 6 | 2 | PET | 12 | 10 |
| 7 | 3 | Microlens | 12 | 3.2 |
| 8 | 4 | Microlens | 7 | 6 |
| 9 | 4 | Microlens | 10 | 2 |
| 10 | 4 | Microlens | 3 | 37 |

A 20 µm diameter microlens array film was used as a substrate. The absorbing layers were deposited on the back side of the microlens film.

Comparative Examples 1 and 2

Coating solution 5 and IR-Dispersion 2-Hardcoat blend were coated with a #12 Meyer rod on the back side of the microlens array film and UV cured in a similar manner as Examples 1-10 above to prepare comparative examples 1 and 2 respectively.

Absorptance Measurement

The transmission and reflectance measurements (specular included) were made on a Hunterlab UltraScan PRO spectrophotometer (Hunter Associates Laboratory, Reston, VA) that meets CIE, ASTM and USP guidelines for accurate color measurement. The UltraScan PRO uses three Xenon flash lamps mounted in a reflective lamp housing as light source. The spectrophotometer is fitted with an integrating sphere accessory. This sphere is 152 mm (6 inches) in diameter and complies with ASTM methods E903, D1003, E308, et. al. as published in "ASTM Standards on Color and Appearance Measurements", Third Edition, ASTM, 1991. All samples were measured on the coated side with the uncoated lens side facing the white plate. The spectra were measured in the range of 350-1050 nm with 5 nm optical resolution and reporting intervals. HunterLab's EasyMatch QC software helped in processing displaying, analyzing and reporting the spectral and color measurements.

Absorptance was calculated by subtracting (100%−(Transmission %+Reflectance %)) for each wavelength.

Figure 11:
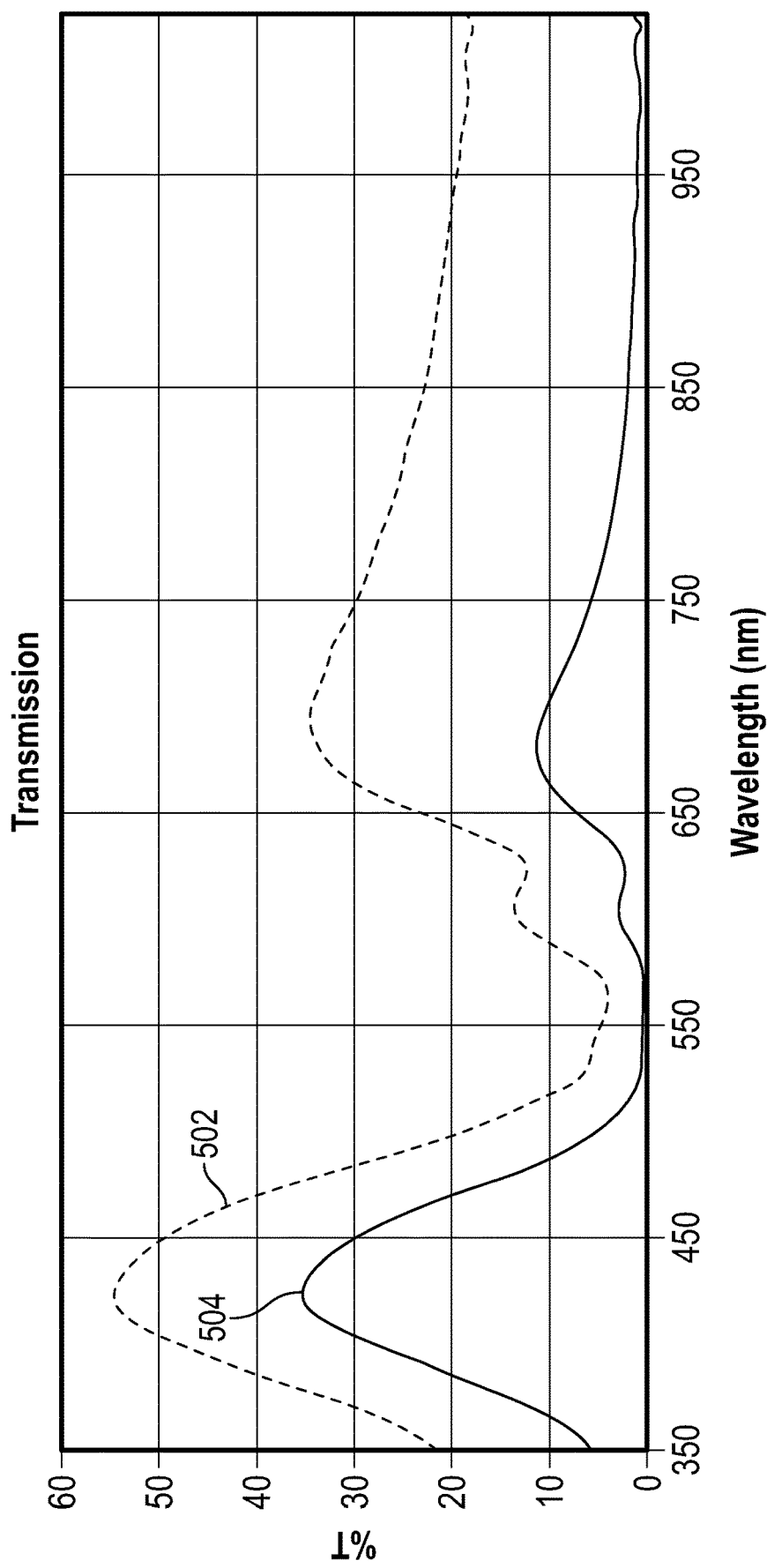
FIG. 11 is a plot of optical transmittance through exemplary optical constructions.

The masks made on clear PET and microlens films were both used for transmission measurements, whereas those coated on the microlens films were illuminated with an intense laser beam to generate arrays of openings. Transmission curves were recorded using a Hunterlab spectrometer, and the results are depicted in FIG. 11 for Examples 2 (curve 502) and 4 (curve 504.

The visible light transmission was measured using a Byk Hazegard instrument, and the results are reported in Table 2 for some of the measured examples.

Figure 12:
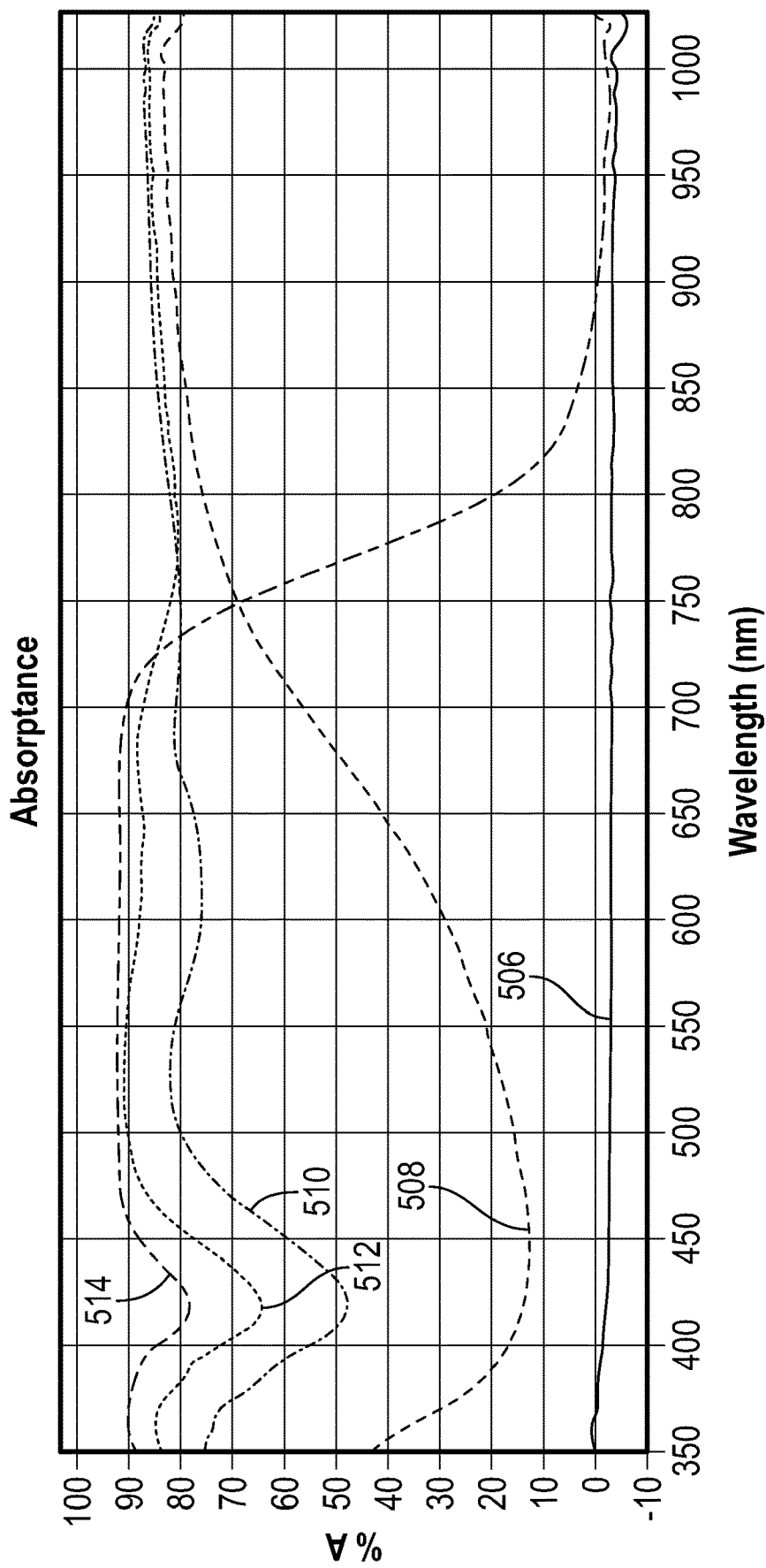
FIG. 12 is a plot of absorption of comparative and exemplary optical constructions.

Further, FIG. 12 shows Absorptance for various exemplary and comparative examples. Curve 506 is the absorptance for an uncoated microlens film, curve 508 is the absorptance for Comparative Example 2, which includes a selective IR light absorbing visibly transmissive pigment, whereas curve 514 is the absorptance for Comparative Example 1, which includes a visible light absorbing IR transmissive pigment. When the two pigments are combined, a light blocking layer can be formed that absorbs in both visible and Infrared. Curve 510 is the absorptance for Example 5, and curve 512 is the absorptance for Example 7.

Examples 7-8 were selected for initial laser ablation experiments to form openings. Through holes in the mask layers were formed via laser ablation through the microlenses. A 40W pulsed fiber laser (SPI Lasers, UK) operating at a wavelength of 1070 nm was used in the experiments. An intense and high-quality beam was generated by the laser. The fiber laser was protected from back reflection with a Faraday isolator mounted at the end of the beam delivery fiber. The laser beam diameter after passing through a beam expander was approximately 10 mm. The beam was directed to a commercially available laser scanner head (hurrySCAN III 14) acquired from SCANLAB AG (Germany) with a dielectric mirror. After being reflected down by a pair of galvo-mirrors the beam was finally focused by an F-Theta telecentric focusing lens. A 167 mm focal length focusing lens was used in the ablation experiments. The scanner was mounted to a manual Z-stage to control position in the Z direction.

The following parameters were used for laser ablation. Scanning speed: 2 m/s; Distance between lines: 100 microns; Pulse length: 250 ns; Repetition rate: 20 kHz; and Laser power: 20%-40%.

Figure 13:
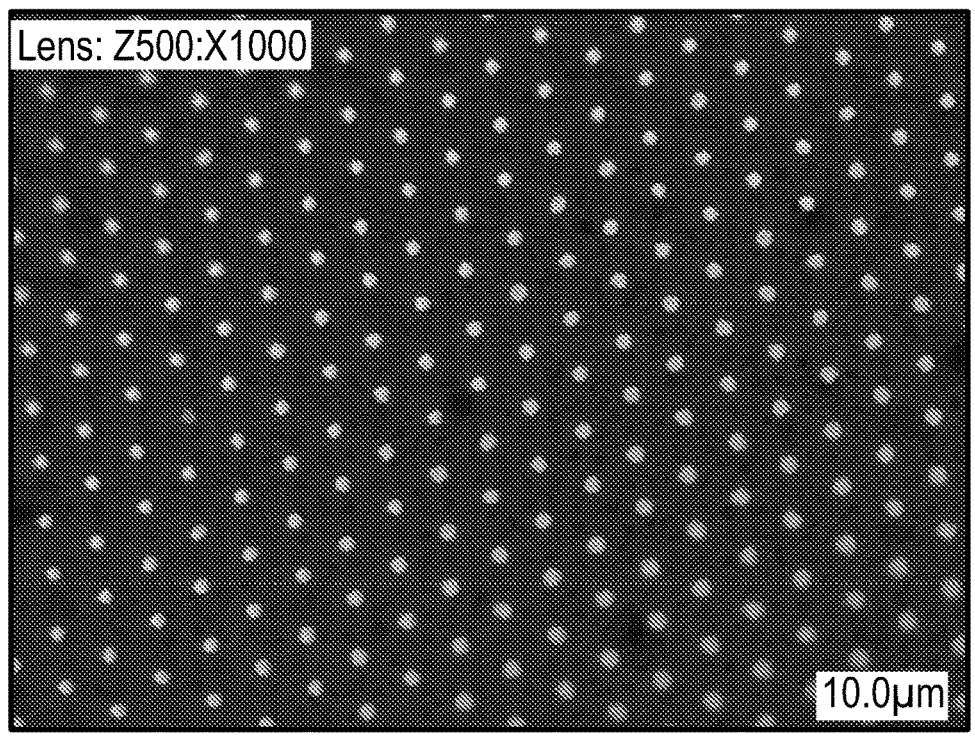
FIG. 13 is a bottom view image of optical transmittance through an exemplary optical construction.
Figure 14:
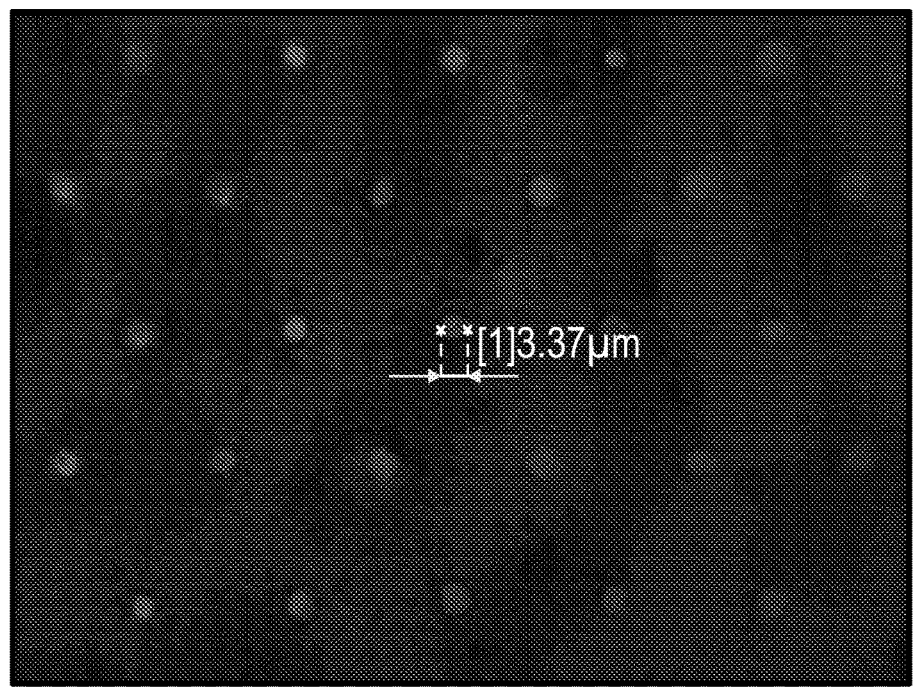
FIG. 14 is a bottom view high magnification image of optical transmittance through the optical construction of FIG. 13.

After the laser ablation process was completed, a section of each mask was inspected with a Keyence VHX-2000 microscope to confirm quality of the generated openings. An example of an array of openings created in Examples 7-8 are shown in FIGS. 13-14 respectively. While not reported here, angular transmission measurements on the laser ablated samples with openings can also be made. here.

All references and publications cited herein are expressly incorporated herein by reference in their entirety into this disclosure, except to the extent they may directly contradict this disclosure. Illustrative embodiments of this disclosure are discussed, and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. An optical construction comprising:
   a lens film comprising an outermost structured first major surface and an opposing outermost substantially planar second major surface, the structured first major surface comprising a plurality of microlenses; and
   a mask disposed adjacent to the second major surface of the lens film and comprising a plurality of laser-ablated openings disposed through the mask, the openings aligned to the microlenses in a one-to-one correspondence, wherein the mask further comprises a UV-cured polymer material and an optically absorptive material comprising oxide nanoparticles.

2. The optical construction of claim 1, wherein the oxide nanoparticles of the optically absorptive material comprise at least one of potassium tungsten oxide nanoparticles or potassium barium tungsten oxide nanoparticles.

3. The optical construction of claim 1, wherein the mask further comprises carbon black, and a light scattering material different from the carbon black and the oxide nanoparticles.

4. The optical construction of claim 1, wherein the microlenses of the plurality of microlenses are arranged in a hexagonal pattern.

5. The optical construction of claim 1, wherein the openings of the plurality of openings have an average diameter of at least 1 micron and no greater than 10 microns.

6. The optical construction of claim 1, wherein the mask further comprises a first refractive index and at least some of the openings are at least partially filled with a polymeric material having a second refractive index, a real part of the second refractive index being less than a real part of the first refractive index.

7. The optical construction of claim 1, wherein a transmission spectrum of the mask without the openings disposed therethrough comprises a peak in a range of about 300 nm to about 500 nm.

8. An electronic device comprising:
   a display;
   an optical construction disposed on the display and comprising:
      a lens film comprising an outermost structured first major surface and an opposing outermost substantially planar second major surface, the structured first major surface comprising a plurality of microlenses; and
      a mask disposed adjacent to the second major surface of the lens film and comprising a plurality of laser-ablated openings disposed through the mask, the openings aligned to the microlenses in a one-to-one correspondence, wherein the mask further comprises a UV-cured polymer material and an optically absorptive material; and
   an optical sensor disposed adjacent to the optical construction opposite the display, such that the mask is disposed between the lens film and the optical sensor, and an infrared (IR) light source in optical communication with the optical sensor.

9. The device of claim 8, wherein the optical sensor comprises a plurality of sensor pixels aligned to the microlenses of the plurality of microlenses and the openings of the plurality of openings in a one-to-one correspondence.

10. The device of claim 8, wherein the display comprises an emissive display comprising a plurality of pixels configured to generate and emit light.

11. The device of claim 8, wherein the display comprises an organic light emitting diode (OLED) display or a liquid crystal display.

12. The device of claim 8, wherein a first adhesive layer bonds the optical construction to the display, the first adhesive layer having an index of refraction of less than about 1.3 for at least one visible wavelength, and wherein a second adhesive layer bonds the optical construction to the optical sensor.

13. A biometric or bioanalytic assembly comprising the electronic device of claim 8.

14. A molecular analysis assembly comprising the electronic device of claim 8.

15. The optical construction of claim 8, wherein the mask further comprises a first refractive index and at least some of the openings are at least partially filled with a polymeric material having a second refractive index, a real part of the second refractive index being less than a real part of the first refractive index.

16. The optical construction of claim 8, wherein a transmission spectrum of the mask without the openings disposed therethrough comprises a first peak in a range of about 300 nm to about 400 nm and a second peak in a range of about 600 nm to about 1000 nm.

* * * * *